US009395911B2

(12) United States Patent
Qian et al.

(10) Patent No.: US 9,395,911 B2
(45) Date of Patent: Jul. 19, 2016

(54) COMPUTER INPUT USING HAND DRAWN SYMBOLS

(71) Applicant: Lenovo (Singapore) Pte. Ltd., Singapore (SG)

(72) Inventors: Ming Qian, Cary, NC (US); Jian Li, Chapel Hill, NC (US); Steven Richard Perrin, Raleigh, NC (US); Song Erin Wang, Cary, NC (US); Jianbang Zhang, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 326 days.

(21) Appl. No.: 14/228,585

(22) Filed: Mar. 28, 2014

(65) Prior Publication Data

US 2015/0277745 A1    Oct. 1, 2015

(51) Int. Cl.
*G06F 3/0481* (2013.01)
*G06F 3/0488* (2013.01)
*G06F 17/30* (2006.01)

(52) U.S. Cl.
CPC ...... *G06F 3/04883* (2013.01); *G06F 17/30259* (2013.01); *G06F 17/30277* (2013.01)

(58) Field of Classification Search
CPC .......... G06F 3/04883; G06F 17/30259; G06F 3/0481
See application file for complete search history.

(56) References Cited

U.S. PATENT DOCUMENTS

| 6,340,967 | B1 * | 1/2002 | Maxted | G06F 3/04883 345/156 |
| 6,476,834 | B1 * | 11/2002 | Doval | G06F 9/4443 715/826 |
| 9,147,057 | B2 * | 9/2015 | Raffa | G06F 3/04883 |
| 9,147,125 | B2 * | 9/2015 | Wang | G06K 9/6202 |
| 2002/0141643 | A1 * | 10/2002 | Jaeger | G06F 3/0481 382/181 |
| 2010/0156837 | A1 * | 6/2010 | Maw | G06F 3/0238 345/173 |
| 2013/0207901 | A1 * | 8/2013 | Blants | G06F 3/04883 345/173 |

* cited by examiner

*Primary Examiner* — Rashawn Tillery
(74) *Attorney, Agent, or Firm* — Schwegman, Lundberg & Woessner, P.A.

(57) ABSTRACT

According to one example embodiment there is disclosed a system having a touch sensitive component responsive to a pen-based input includes a memory or storage device storing a symbol library defining at least one symbol representative of at least one logograph, pictograph or ideogram, the symbol library information specifying a topology structure defining sub-regions that symbol elements can appear in the at least one logograph, pictograph or ideogram, and a processor operatively connected to the touch sensitive component and the memory or storage device and operative to execute program instructions to interpret hand drawn indicia to identify at least one symbol based on recognizing at least one symbol element and its respective position in a sub-region.

16 Claims, 9 Drawing Sheets

| | 601 | 602 | 603 | 604 |
|---|---|---|---|---|
| ORIGINAL ICON (TOO COMPLEX TOO DRAW) | | | | |
| SIMPLIFIED DRAWING INPUT | | | | |
| EXPLANATION | HIGH PERFORMANCE vs. HIGH ENERGY SAVING<br><br>(THE RELATIVE HEIGHTS OF TWO DRAWING BARS CAN DECIDE THE BIAS PERCENTAGE TOWARDS HIGH PERFORMANCE AND HIGH ENERY SAVING) | AIRPLANE MODE<br><br>(DRAWS A CIRCLE ON THE LEFT → MODE ON;<br><br>DRAWS THE CIRCLE ON THE RIGHT → MODE OFF) | MUTE AUDIO<br><br>(DRAWS √ - AUDIO ON;<br><br>DRAWS X - AUDIO OFF) | Wi-Fi ON/OFF<br><br>(DRAWS WITH GREEN COLOR → Wi-Fi ON;<br><br>DRAWS WITH RED COLOR → Wi-Fi OFF) |

COMPUTER INPUT USING HAND DRAWN SYMBOLS

TECHNICAL FIELD

This application relates generally to input systems for computing systems, and more particularly to systems enabling hand drawn input.

BACKGROUND

Action sequence programming is an important feature for gaming and other applications. For example, Nintendo Corporation's Wii® controller has the capability of programming a sequence of up to 80 actions using physical gestures in 3D space. This sequence can be played back with the push of a button. While the Wii® system requires state-of-the-art technology to record physical gestures to create an action sequence, the idea of recording action sequences in writing is very old. For example, the logograph/pictograph characteristics of the Chinese language have long been used to program and record action sequences. One example is the music note sequence recording for the Chinese Guqin, the ancient Chinese 7-string zither. The music note sequence is a memo to record music play actions. These notes are composed of symbols of fingering instruction. Every note in a Guqin music score is composed of some logograph components from a certain number of Chinese characters.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
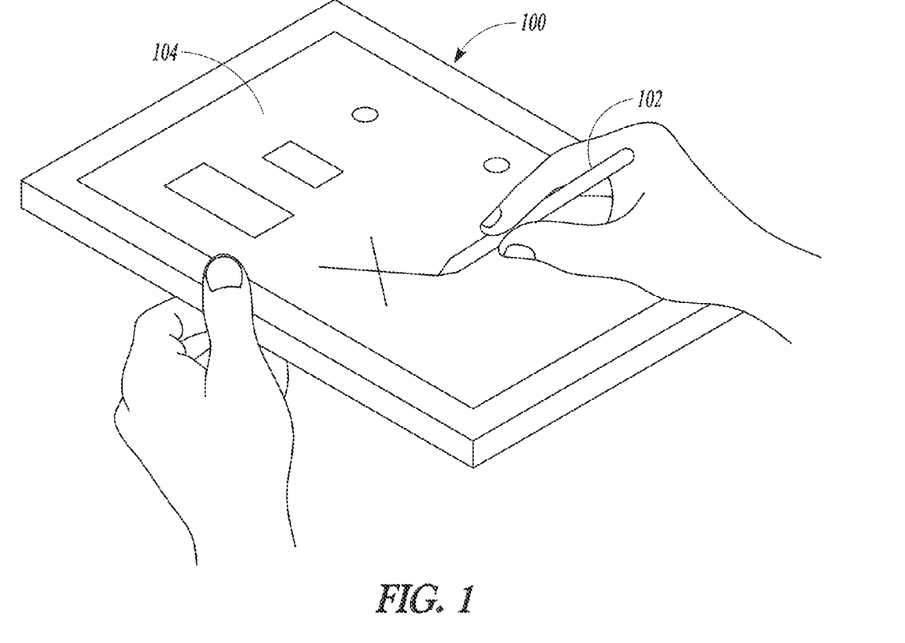
FIG. 1 is an example embodiment of a device with a pen-based input system.

Illustrated in the various figures, and described herein below, are methods, systems, apparatus and computer products to provide software components and architecture to support pen-based input to a device using hand drawn symbols. According to one example embodiment illustrated in FIG. 1, there is provided a computing device 100 with a touchscreen or other input system 104 that can detect or receive symbols hand drawn by a user with a pen (also referred to as a stylus) 102, and determine a correspondence or match to a predefined symbol. In one example embodiment, the predefined symbols are part of a predefined symbol set based on one or more symbols of a symbol set formed from logographs, pictographs and/or ideographs. According to one such embodiment, the symbols of the predefined symbol set are based on a language that carries meaningful logograph, pictograph and/or ideograms. Alternatively, for example, the predefined symbol set is based on a widely recognizable logograph, pictograph and/or ideogram set. According to one example embodiment, the symbols in the symbol set provide action/gesture input that is used to support action/gesture sequence programming.

As used here, the term "logograph" means a single grapheme which represent a word or a morpheme, the term "pictograph" means a graphical symbol to represent a concept, object, activity, place or event by illustration, the term "ideograph" means a graphical symbol to represent an idea, the term "hieroglyph" means a character in any a system of writing that is pictorial in nature, and the term "symbol" means something used for or regarded as representing something else. For example, Chinese is one language that carries a meaningful logograph, pictograph and/or ideogram set. Hieroglyphics use different glyphs for representing logographs and phonetics.

According to one example embodiment, one or more of the predefined symbols are simplified forms of respective corresponding logographs, pictographs and/or ideographs. In this embodiment, the term "simplified symbol" means that the symbol is more efficient than its more complex counterpart, for example by virtue of having fewer visual elements or features than a corresponding logograph, pictograph and/or ideograph, so that it is more efficient to draw by a user as compared to its more complex corresponding counterpart. According to one example embodiment, a simplified symbol is more efficient to draw due to having fewer visual elements or features than the complex counterpart, allowing it to be drawn more quickly than the complex counterpart. According to another example embodiment, a simplified symbol is more efficient to draw due to being easier to draw consistent with the ideal form than the complex counterpart, allowing it to be drawn more quickly and recognized more easily due to greater consistency of appearance compared to drawings of more complex counterparts.

Figure 2:
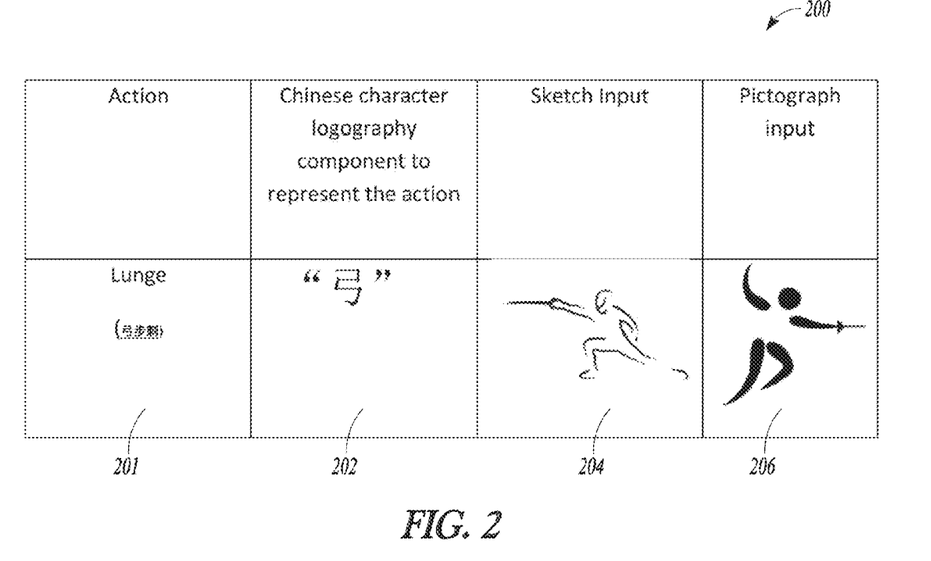
FIG. 2 illustrates an example of using multiple or different forms of pen-based inputs to program an action.
Figure 3:
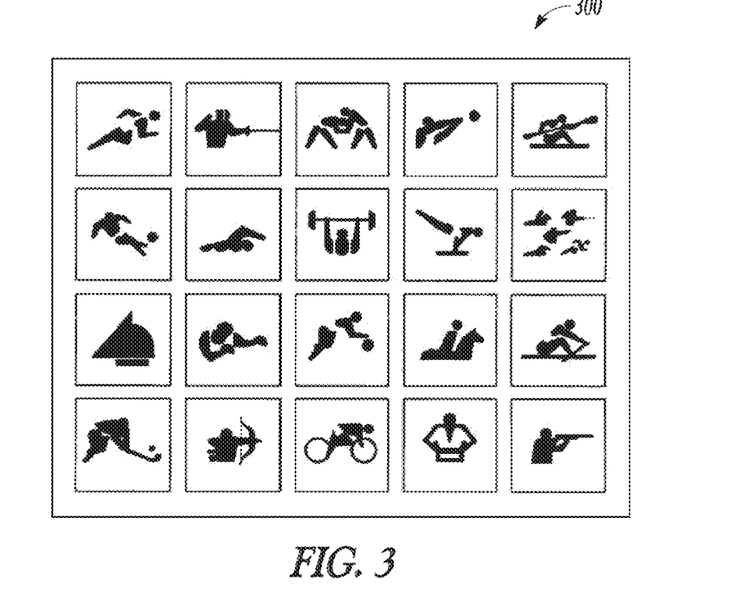
FIG. 3 illustrates universally recognized Olympic pictographs
Figure 4:
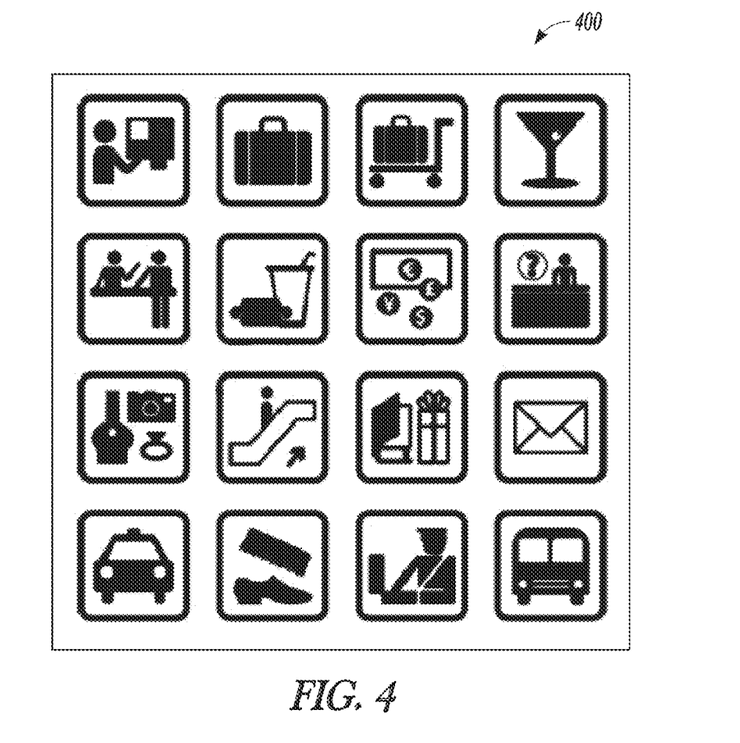
FIG. 4 illustrates airport ideograms.

Further, according to one example embodiment, there is provided a symbol topology structure and a library of predefined symbols to input information or commands into a computing system. According to one embodiment, the predefined symbols may be used to enter action/gesture sequences. For example, referring to FIG. 2, there is shown a table 200 illustrating an example of using multiple or different forms of pen-based simplified symbols to program a sword action ("lunge") 201 using a Chinese character logography symbol 202, drawing a sketch 204, or drawing a pictograph 206, using pen-based input to system 100. While words, such as "lunge" in the example of FIG. 2, can be used for inputting a corresponding concept, the sketch and pictograph inputs can also be used, and can help to overcome language barriers. For example, the universally recognized Olympic pictographs 300 in FIG. 3 can be used as one set of pictographic inputs to represent their corresponding sports. For another example, the airport ideograms 400 illustrated in FIG. 4 are another set of universally recognizable symbols that can be used for representing their corresponding airport services, facilities or activities. According to example embodiments, these sets of pictographs or ideographs can form the basis for a corresponding set of simplified hand-drawn symbols, structured as set forth herein, to provide a set of inputs recognizable by the system 100.

According to one example embodiment, users can program actions or gestures by hand drawing symbols into related sections of a symbol topology structure defining one or more of sub-regions of the overall region of the symbol topology structure, preprogrammed for a specific game application executing on the computing system. For example, if a user is programming the action of a computer game character holding a gun in the left hand and a sword in the right hand, different verb words or components of the verb words can be used to program the character's action pattern in a first sub-region of the topology structure. For example, sword actions can be programmed using the words lunge, thrust, block, strike, slash, bash and riposte. Other aspects of the actions, such as different types of ammunition or the type of the sword used can be specified in other sub-regions of the topology structure.

Figure 5A:
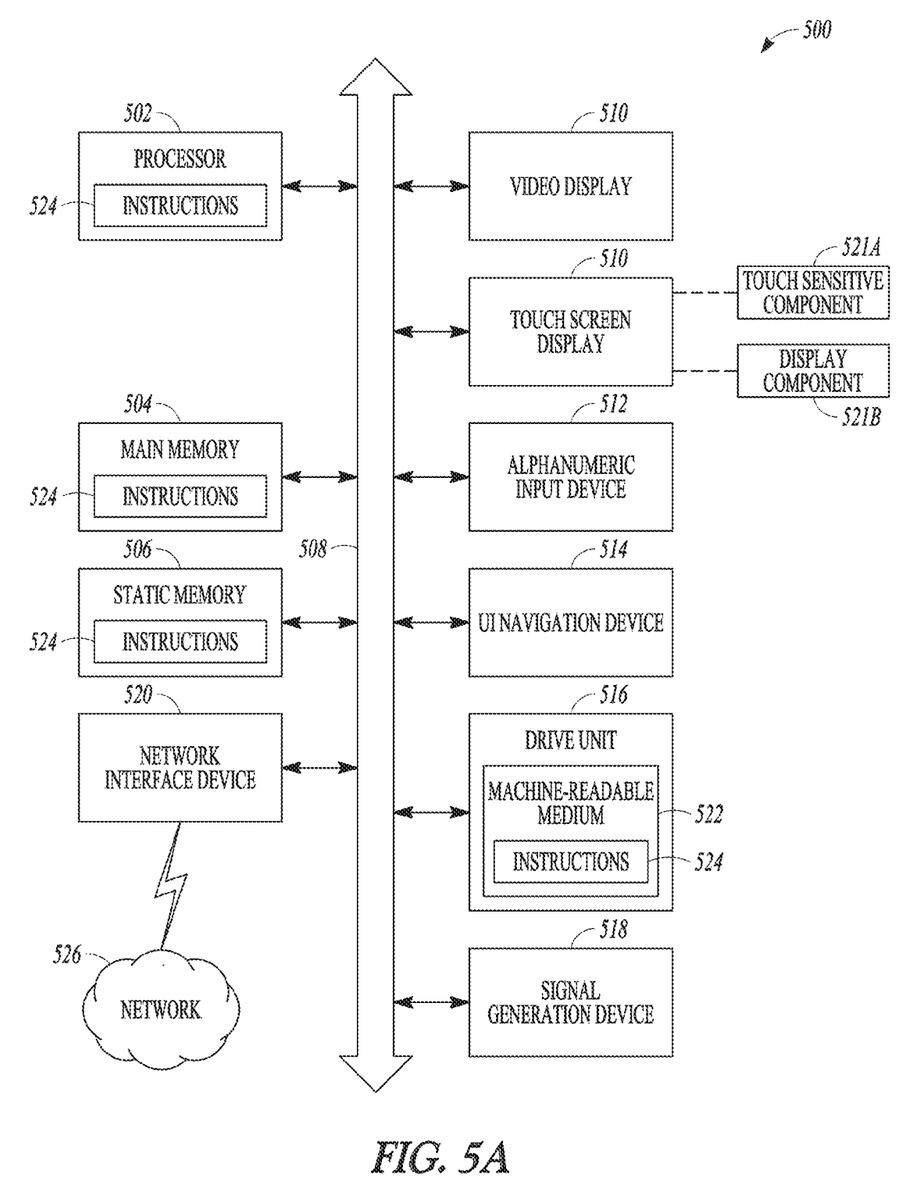
FIG. 5A illustrates an example embodiment of a computing system with a touch sensitive input system.

As illustrated in FIG. 5A, there is illustrated in more detail an example computing device 100 in the example form of a computer system 500 within which instructions, for causing the machine to perform any one or more of the methodologies or functions discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a notebook computer, a set-top box (STB), a Personal Digital Assistant (PDA), a smart phone, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 512 (e.g., a central processing unit (CPU), a graphics processing unit (GPU) or both), a main memory 510 and a static memory 516, which communicate with each other via a bus 518. The computer system 500 also includes a touch screen display 521 that serves as a display and input device and is responsive to pen 102 and/or a user's touch, for example as provided in the Samsung® Galaxy® smart phones that are oriented towards pen computing and ship with a pen and incorporate a pressure-sensitive Wacom digitizer. According to one embodiment, ouch screen display 521 has a touch sensitive component 521A and a display component 521B, wherein the touch sensitive component is responsive to pen-based input in the form of hand drawn elements such as, but not limited to, pictures, symbols or drawing or graphics. According to one embodiment, the pen responsive device 521 may be a multi-touch input device. Computing system 500 further includes a disk drive unit 526, a signal generation device 528 (e.g., a speaker) and a network interface device 520.

According to one example embodiment, the computer system 500 may further include a video display unit 520 (e.g., a liquid crystal display (LCD) or a cathode ray tube (CRT)), an alphanumeric input device 522 (e.g., a keyboard), and a user interface (UI) navigation device 524 (e.g., a mouse). The disk drive unit 526 includes a machine-readable medium 522 on which is stored one or more sets of instructions and data structures (e.g., software) 524 embodying or used by any one or more of the methodologies or functions described herein. The instructions 524 may also reside, completely or at least partially, within the main memory 514 and/or within the processor 512 during execution thereof by the computer system 500, the main memory 514 and the processor 512 also constituting machine-readable media.

Figure 5B:
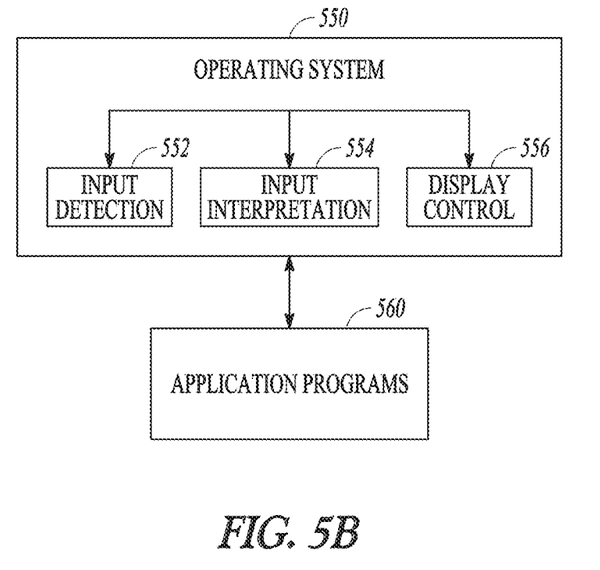
FIG. 5B illustrates an example embodiment of software components of the system of FIG. 5A.

As illustrated in FIG. 5B, the computing system 500 further includes an operating system 550 that in turns includes input detection program 552 that provides for detecting input drawn using a pen (or stylus) 102 into the touch screen display 521, and display activation programs 554 that produce control signals and data to activate the touch screen display 521 to display indicia corresponding to the pen input, so a user sees his or her input appear on the display 521 as they draw. An input interpretation program 556 includes a plurality of program components, for example software objects, subroutines and libraries, that interpret input entered using pen 102 and output data 558 corresponding to the interpreted input. Output data 558 is consumed by the operating system 550, or other application software programs 560, which include computer program functions responsive to the data 558. According to an alternate embodiment, any one of or all of the input detection program 552, display activation program 554 or input interpretation program 556 may exist in either the operating system 550, the application software program 560, in both the operating system 550 or application software program 560, or only in application software program 560.

Figure 6:
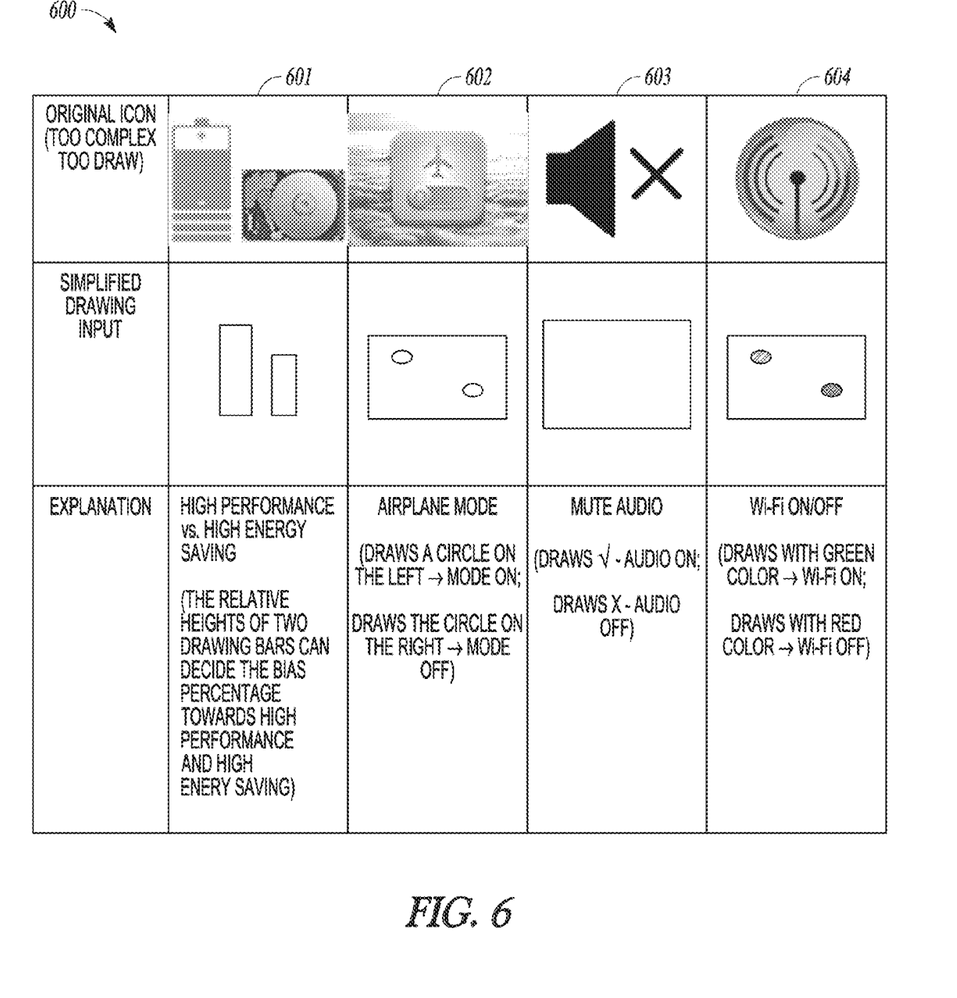
FIG. 6 illustrates a set of example ideograms used for four computer functions.

According to another example embodiment illustrated in FIG. 6, there is illustrated a table 600 describing in more detail a set of example ideograms used for four computer functions—performance versus energy saving, airplane mode, audio mute and WiFi on/off. Each column 601-604 shows, in each respective row, the original icon (that is too complex to easily draw) for a power management function, a simplified drawing input serving as an ideogram for the respective power management function, and the explanation for how the ideograms are interpreted by computing device 100 to control the respective functions.

Figure 7A:
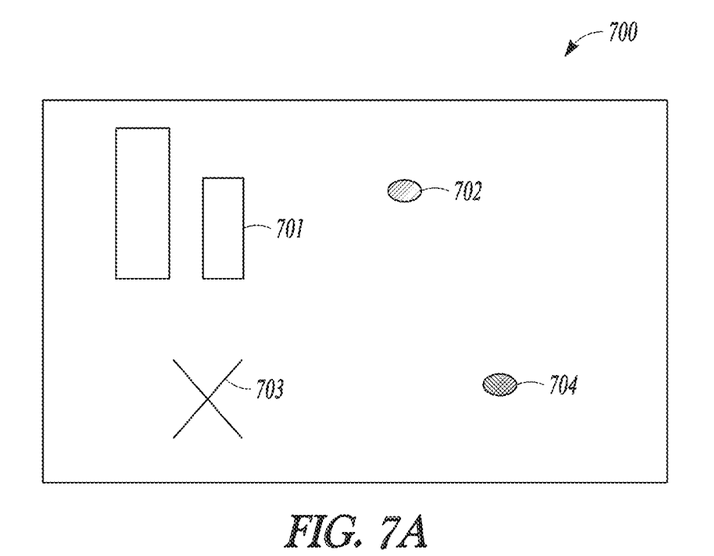
FIGS. 7A and 7B illustrate an example device power management ideogram configuration.
Figure 7B:
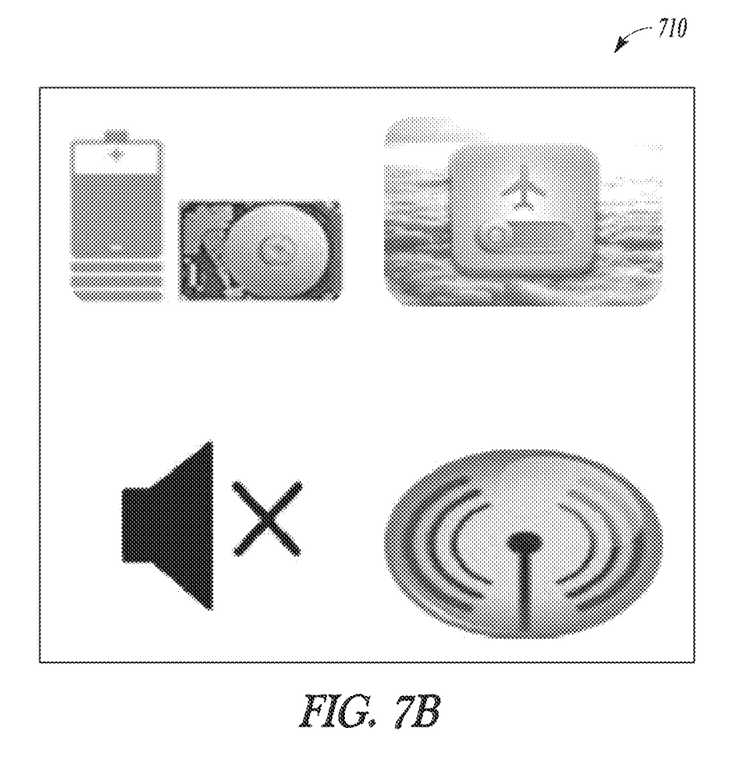

According to one example embodiment illustrated in FIGS. 7A and 7B, there is shown a device power management ideogram configuration. A topology structure 700 is defined so that each quadrant or sub-region 701-704 of the topology structure serves as an input field for specific configuration entries for a device hand-drawn by a user into the input device of a computing system, such as performance versus energy saving 601, airplane mode 602, audio mute 603 and WiFi on/off 604. FIG. 7A shows the simplified hand-drawn inputs based on the ideograms of FIG. 6, while FIG. 7B illustrates the more complex pictography icons 710 in the corresponding quadrants or sub-regions of the respective overall rectangular region defined by the topology structure. According to one embodiment, the simplified ideograms (i.e. symbols) are hand-drawn into the touch screen display 111 of device 100 and the device 100 matches the hand drawn symbols to the predefined symbols defined in FIG. 6.

Figure 8:
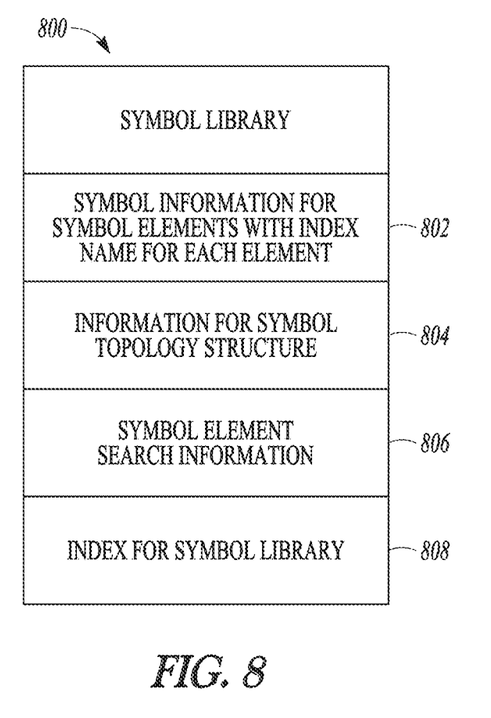
FIG. 8 illustrates a symbol library structure according to one example embodiment.
Figure 9:
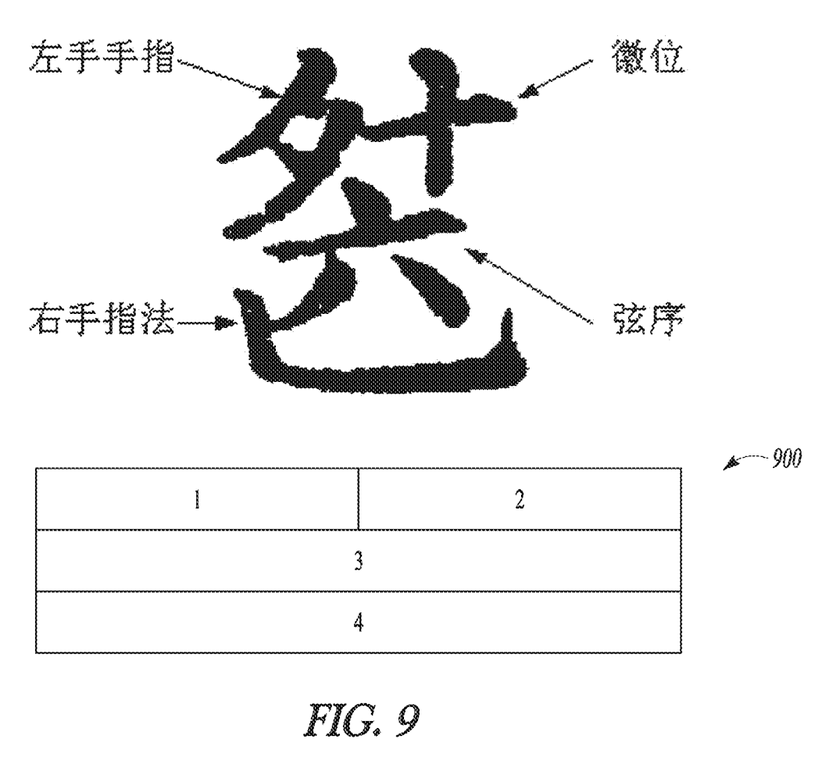
FIG. 9 illustrates a topology structure according to one example embodiment.

According to one example embodiment there is provided a symbol library 800. According to one embodiment, the symbol library is stored in a memory or storage device in digital data form, to provide an electronic symbol library. For this purpose, one or multiple topology structures can be defined. For example, as illustrated in FIG. 9, a four-part topology structure is defined for the Guqin note. According to one example embodiment illustrated in FIG. 8, the symbol library 800 includes symbol information for all predefined symbols (also referred to as inputs) 802, also referred to as symbol elements 802 and all symbol topology structures 804 allowed, and provides component search information 806. Each symbol element 802 is, according to one example embodiment, annotated with an index name. An index library 808 is, according to one example embodiment, structured as described below.

Further, according to one example embodiment, the topology structure is analyzed so that each possible structure is categorized into representations characterized by their unique formation. For example, as illustrated in FIG. 9, a topology structure for a Guqin music note can be divided into a 3-row and 2-column structure 900, and the second and third rows can be merged to represent right-hand finger action, and string number. The two columns in the first row can be kept to represent left-hand finger action and Hui position. Then, by combining the symbol element index names and topology structure element information, every possible note and topology structure combination can be represented with an index stored in an index library 808 stored in the computing device 100, for example in one of its memories or other storage devices. For the example note, a left hand ring finger is used within a 3-rows and 2-column topology structure can be represented using the following format record in the index library 86:

[ei]{[m*n][SL][ek]};

where
  ei is the index name for the symbol element (e.g. the logograph symbol representing ring finger, "夕");
  m*n is the size of the topology structure (e.g. 3 rows and 2 columns);
  SL is the size of marked up sequence number for all elements;
  ek is the symbol element's sequence number.
For example, one record in the index library can be [夕]{[3*2] [1,2,3,3,4,4],[1]}.

Figure 10:
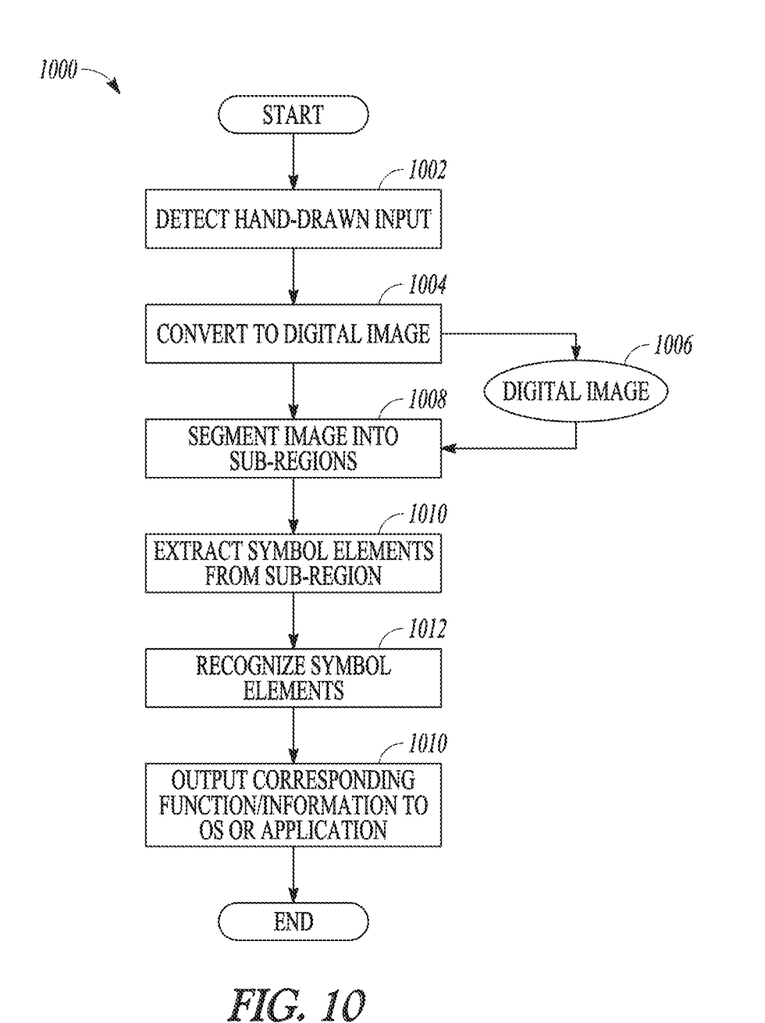
FIG. 10 illustrates a flow chart of an example process and computer program operation.

Referring to FIG. 10, there is illustrated a flow chart 1000 wherein a users' handwriting input to the touchscreen display 111 of device 100 is detected 1002 and converted 1004 to a digital image 1006 using input interpretation program 556, and the digital image is represented in output data 958 corresponding to the input. Different symbol elements 802 are extracted 1010 from the image 1006 by segmenting 1008 the whole topology structure into sub-regions, again based on the respective topology structure specified in symbol library 800 stored in device 100. The symbol elements are then recognized and/or interpreted 1012 by inspecting each symbol element and matching to a symbol element in the library 800. After interpretation, the corresponding function or information from the interpretation is output to the operating system 550 or application programs 560.

Thus, as described above, there is provided an input program and process for users to enter the input symbols. Further, there is provided an analyzer program and process to use the symbols in a symbol library and compare the input symbol with the symbol library symbols. According to one example embodiment, if the symbol is interpreted inside an application executing on the computing system, the application will execute the relevant event triggered by the entered symbol. According to another embodiment, if the interpreter is outside the application, the relevant event triggered by the identified symbol will be passed to the application. For example, the application could have event receivers scanning for the event, and once the event is identified, the corresponding action will be selected and executed.

According to another example embodiment, for different logograph, pictography and/or ideogram sets, different symbol elements, topology structures, symbol libraries and index libraries can be designed so that a device can recognize the relevant hand-drawn input with the help of input subsystems, wherein the respective symbol libraries contain the predefined simplified symbols for at least some more complex pictograph, logograph and/or ideogram oriented symbols.

The potential benefits of the above-described technology include:
  Helping users to learn or practice language skills—e.g. Chinese, or any logography, pictograph and/or ideogram oriented language—while performing other tasks such as action planning for a computer game or gesture input.
  Users can plan a sequence of action using hand drawn inputs, and play that sequence with the click of a button once the recording is made.
  Using an input method based on pictograph drawing to overcome the language barrier. Users who do not speak or write a common language can communicate through one or more simplified hand drawn symbol sets, for example based on a pictographic set.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 224 may further be transmitted or received over a communications network 226 using a transmission medium. The instructions 224 may be transmitted using the network interface device 220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for computer guided have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A device comprising:
   a storage device;
   a processor coupled to the storage device, wherein the processor receives instructions from the storage device for execution by the processor to:
   identify a hand drawn symbol using a symbol library stored in the storage device, wherein the hand drawn symbol has at least one element, the hand drawn symbol corresponding to a predefined symbol that is defined in the symbol library, the predefined symbol having at least one predefined element and at least one associated predefined symbol topology structure specified in the symbol library, and wherein the predefined symbol topology structure has at least one sub-region, and the symbol library specifies at least one sub-region for the at least one predefined element.

2. A device according to claim 1 further wherein the processor executes the instructions to identify the at least one element in the sub-region for the at least one predefined element.

3. A device according to claim 1 wherein the predefined symbol is a simplified form of a more complex logograph, pictograph or ideogram.

4. A device according to claim 1 further wherein the predefined is stored in the form of a digital image in the storage device, wherein the digital image contains an image of the at least one element.

5. A device according to claim 4 further wherein the processor executes the instructions to identify the at least one element by matching at least a portion of the image of the element in the digital image to the at least one predefined element specified in the symbol library.

6. A device according to claim 1 further wherein the storage device is a random access memory device, a flash memory device, or a magnetic storage device.

7. A device according to claim 1 wherein the hand drawn symbol has two or more elements, and further wherein the processor executes the instructions to match each of the two or more elements to a predefined element from a different sub-region of the at least one predefined topology structure.

8. A method comprising:
   identifying a hand drawn symbol using a symbol library stored in a device, wherein the hand drawn symbol has at least one element and wherein the symbol is represented in an image, and further wherein the hand drawn symbol corresponds to a predefined symbol that is defined in the symbol library, the predefined symbol having at least one predefined element and at least one associated predefined symbol topology structure specified in the symbol library, and wherein the predefined symbol topology structure has at least one sub-region, and the symbol library specifies at least one sub-region for the at least one predefined element.

9. A method according to claim 8 wherein the predefined symbol is a simplified form of a more complex logograph, pictograph or ideogram.

10. A method according to claim 8 further comprising identifying the hand drawn symbol by matching the at least one element of the hand drawn symbol to the at least one predefined element specified in the symbol library.

11. A method according to claim 8 wherein the hand drawn symbol has two or more elements, and further wherein each of the two or more elements are matched to a predefined element from a different sub-region of the at least one predefined topology structure.

12. A method according to claim 8 further comprising an index for the symbol library having the form:

[ei]{[m*n][SL][ek]};

where
ei is an index name for the symbol element;
m*n is a size of the topology structure;
SL is a size of marked up sequence number for all elements; and
ek is a symbol element's sequence number.

13. A non-transitory machine readable storage device having instructions for execution by a processor of the machine to identify a hand drawn symbol using an electronic symbol library, wherein the hand drawn symbol is received by the machine, and further wherein the hand drawn symbol has at least one element, the hand drawn symbol corresponding to a predefined symbol that is defined in the symbol library, the predefined symbol having at least one predefined element and at least one associated predefined symbol topology structure specified in the symbol library, and wherein the predefined symbol topology structure has at least one sub-region, and the symbol library specifies at least one sub-region for the at least one predefined element.

14. A non-transitory machine readable storage device according to claim 13 further wherein the identifying of the hand drawn symbol is performed by an application executing on the machine, and an event is triggered by identification of the hand drawn symbol.

15. A non-transitory machine readable storage device according to claim 13 further wherein the identifying of the hand drawn symbol is performed by an operating system executing on the machine, and an event is triggered by identification of the hand drawn symbol.

16. A device to identify a hand drawn symbol received by the device, wherein the hand drawn symbol corresponds to a predefined symbol that is defined in a symbol library, wherein the predefined symbol has at least one predefined element and at least one associated predefined symbol topology structure specified in the symbol library, the predefined symbol topology structure having at least one sub-region, and the symbol library specifies at least one sub-region for the at least one predefined element, the device comprising:
at least one storage device storing computer program instructions and the symbol library; and
at least one processor operatively coupled to the storage device and operative to execute the computer program instructions to identify the hand drawn symbol using the at least one symbol topology structure and the at least one predefined element specified in the symbol library, and further wherein the predefined symbol topology structure has at least one sub-region, and the symbol library specifies at least one sub-region for the at least one predefined element.

* * * * *